United States Patent [19]

Wise

[11] Patent Number: 5,800,148
[45] Date of Patent: Sep. 1, 1998

[54] BLIND-TAPER HOLE SAW

[76] Inventor: Michael A. Wise, 7851 S. River Rd., Marine City, Mich. 48039

[21] Appl. No.: 984,244

[22] Filed: Dec. 3, 1997

[51] Int. Cl.⁶ ............................................. B23B 41/02
[52] U.S. Cl. .................... 408/204; 408/118; 408/119; 408/206; 30/359
[58] Field of Search ........................ 408/204, 206, 408/119, 118, 117; 30/359, 358, 360, 362, 123, 310; 82/1.5

[56] References Cited

U.S. PATENT DOCUMENTS

| | | |
|---|---|---|
| 39,288 | 7/1863 | Harris . |
| 505,322 | 9/1893 | Moss . |
| 529,049 | 11/1894 | Rich et al. . |
| 581,677 | 4/1897 | Lee . |
| 752,724 | 2/1904 | Taylor . |
| 762,458 | 6/1904 | Willard ........................ 82/1.5 |
| 1,091,502 | 3/1914 | Gearing ........................ 82/1.5 |
| 1,330,385 | 2/1920 | Muden . |
| 2,325,020 | 7/1943 | Shaw ........................ 82/1.5 |
| 2,480,595 | 8/1949 | Moyer et al. ................ 408/159 |
| 2,594,671 | 4/1952 | McTyre et al. . |
| 3,358,722 | 12/1967 | Berry . |
| 4,207,636 | 6/1980 | Lacey ........................ 82/1.5 |
| 4,411,324 | 10/1983 | Liebig ........................ 408/159 |
| 4,487,275 | 12/1984 | Froehlich .................... 408/150 |
| 4,992,010 | 2/1991 | Fischer ....................... 408/159 |

*Primary Examiner*—Daniel W. Howell
*Assistant Examiner*—Adesh Bhargava
*Attorney, Agent, or Firm*—Brooks & Kushman P.C.

[57] ABSTRACT

A rotary tool for forming a blind-tapered hole in a workpiece includes an elongate shaft having a bit shank on one end and a base plate secured to the other end. A collar, mounted for axial movement on the shaft, is biased away from the base plate to a first position on the shaft by a return spring. At least two cutting blades are pivotally attached to the collar. A portion of the length of each cutting blade is fixedly circumferentially and radially supported relative to the shaft by a blade guide that rotates with the shaft such that the angle formed between each cutting blade and the shaft's rotational axis increases with increasing axial displacement of the collar on the shaft away from the first position.

14 Claims, 2 Drawing Sheets

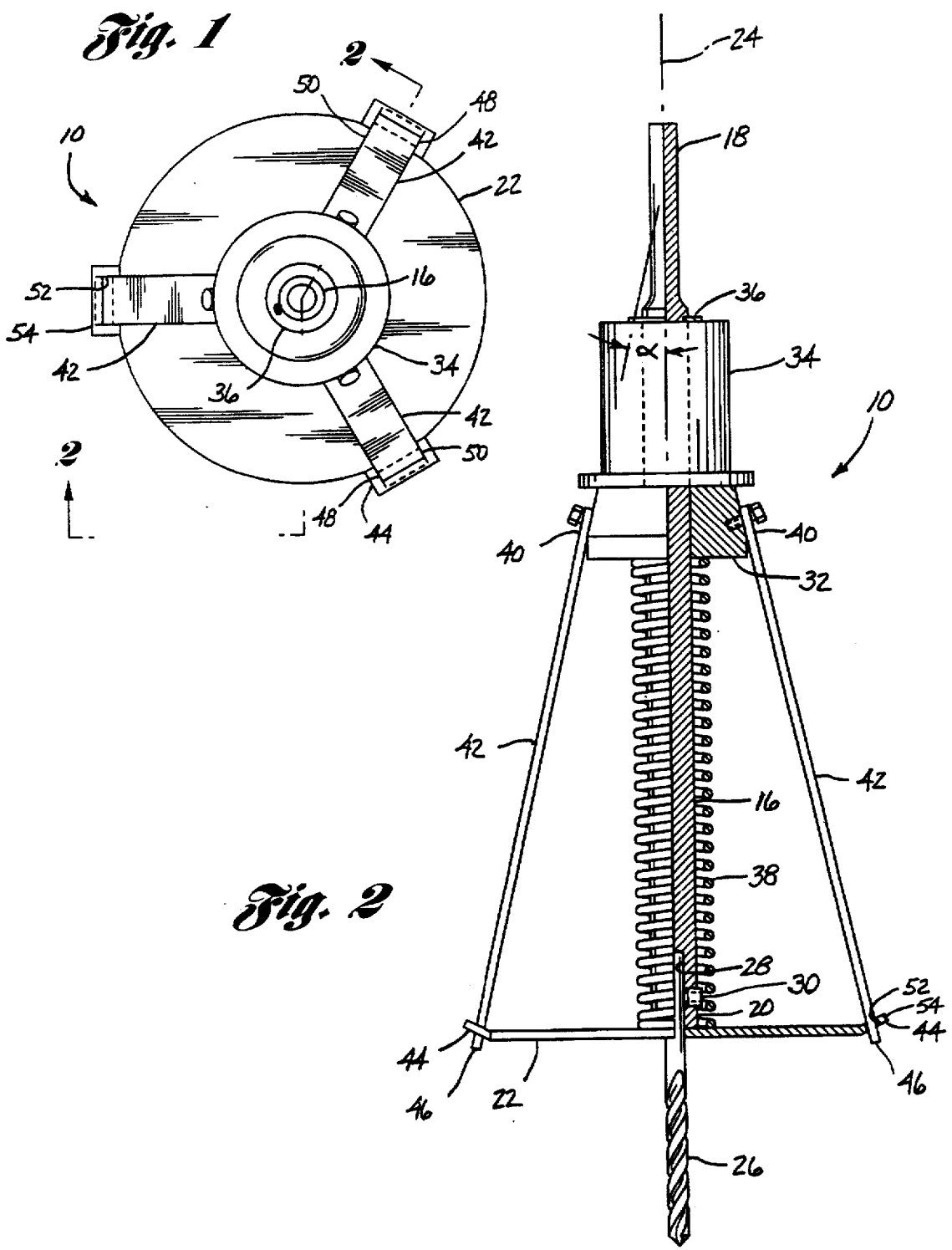

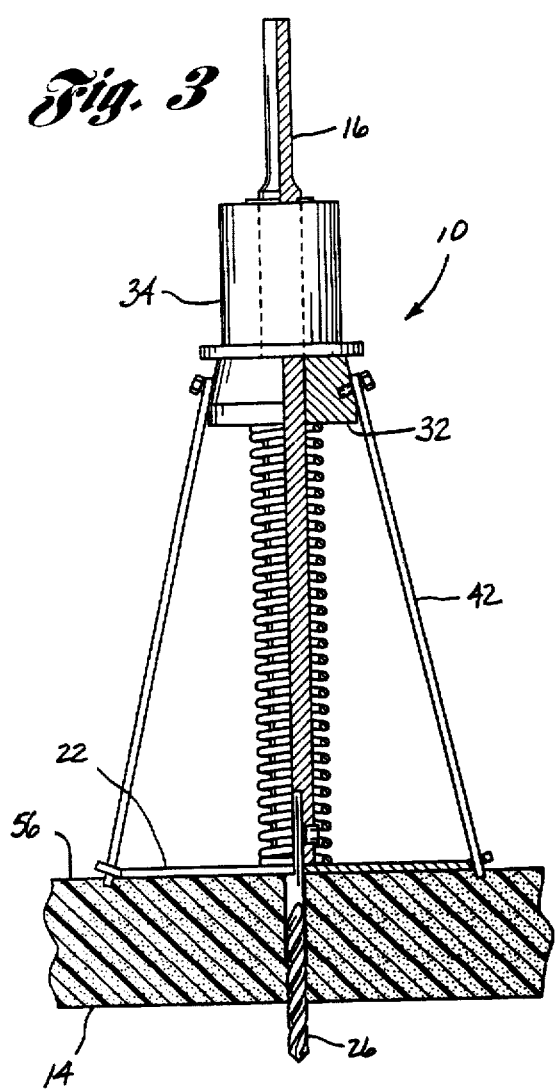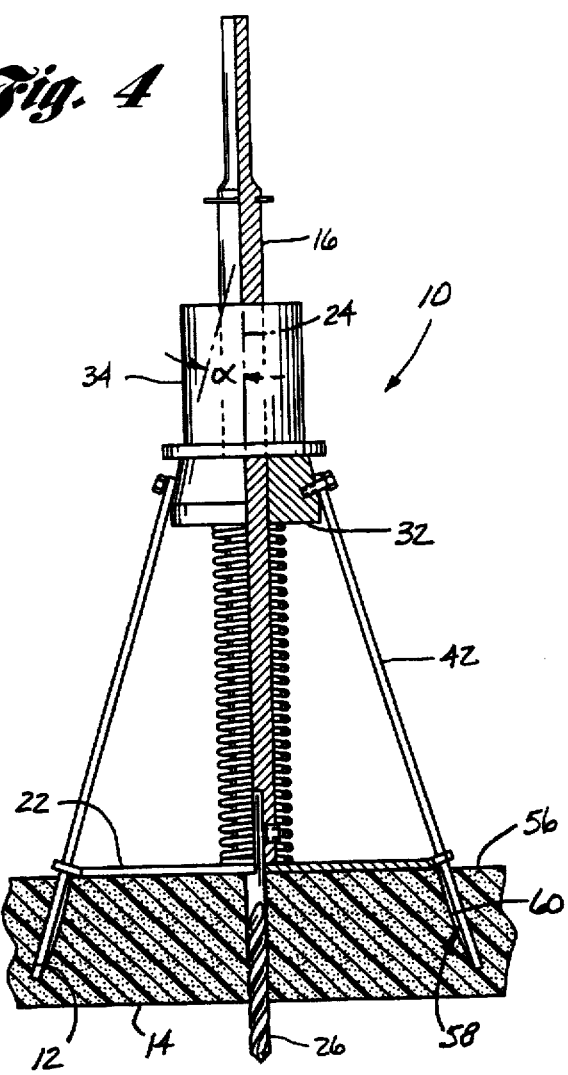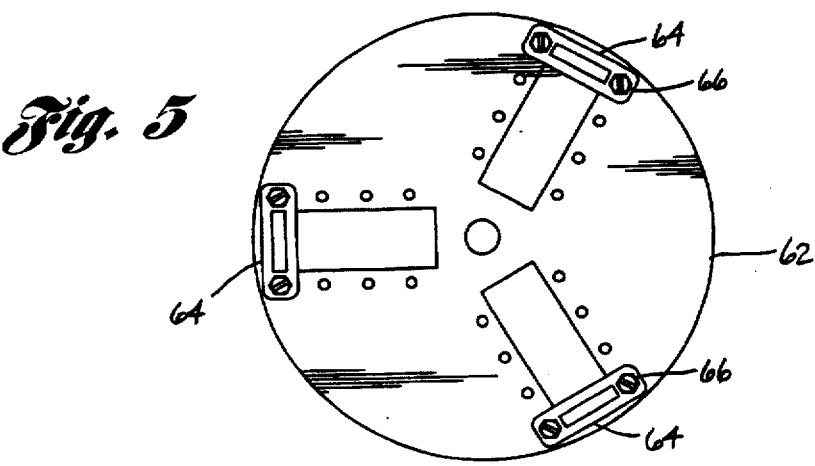

BLIND-TAPER HOLE SAW

TECHNICAL FIELD

The invention relates to apparatus for forming a rearwardly-opening blind-tapered hole in and generally through a workpiece and, specifically, for forming such a hole while generally maintaining the overall integrity of the material to be removed from the workpiece, thereby substantially reducing the amount of loose debris generated upon forming the hole.

BACKGROUND ART

The prior art teaches rotary hole saws which generally include a broad, flat blade which, when rotated about a fixed axis into engagement with a first surface of a workpiece, removes material from the workpiece to form a hole whose diameter is roughly equal to the width of the blade. Generally, the blade removes all workpiece material falling between the outer edges of the blade to produce a generally cylindrical bore. In one design variation, the width of the blade gradually decreases to a minimum value at its tip, whereby rotation of the blade into the workpiece forms a tapered hole, with the hole's diameter decreasing with increasing hole depth. The resulting debris, i.e., the material thus removed from the workpiece by the tip and/or the outer edges of the blade, is characterized by relatively small chips, shavings and particles.

In accordance with another prior art design, the rotary tool's cutting edges are defined by at least two flat blades which may be pivoted relative to one another after the blades have otherwise cooperatively formed a generally cylindrical bore within the workpiece. More specifically, having formed a generally cylindrical bore in the manner previously described, the blades are pivoted such that the separational distance between their respective outer edges is increased, with the maximal separational distance between the outer edges of the blades occurring at the greatest relative depth in the workpiece. In this manner, the generally cylindrical bore is reamed out to achieve a blind-tapered hole, i.e., a hole whose diameter increases with increasing hole depth. Once again, the resulting loose debris thus removed is characterized by relatively small chips, shavings and particles.

The prior art alternatively teaches tools having either a cylindrical cutting element or one or more radially-spaced cutting blades which, when rotated about a fixed axis, carve an annular groove in and, possibly, through the workpiece. As a result, the "core" of the hole thus formed remains substantially intact, with an attendant reduction in the amount of loose debris generated during hole forming.

However, in order to facilitate subsequent removal of the tool from the resulting hole, and to otherwise facilitate removal of the core from the tool, the path along which the respective cutting element or cutting blades travel is either parallel to, or is maintained at a constant angle relative to, the tool's rotational axis. Thus, with the exception of the simple cylindrical cutting element (with its parallel path), elaborate mechanisms are required on such tools to maintain a constant blade angle notwithstanding relative longitudinal displacement of the blades into the workpiece.

What is needed is a rotary tool which is capable of forming blind-tapered holes with minimal debris while further facilitating subsequent removal of both the tool from the workpiece and the resulting core from the tool.

DISCLOSURE OF INVENTION

It is an object of the invention to provide a rotary tool with which to form blind-tapered holes in a workpiece, wherein the tool leaves the core of the hole substantially intact to thereby minimize the amount of loose debris generated during hole forming.

It is another object of the invention to provide a blind-tapered hole saw tool which forms a gap of variable width between the opposed surfaces of the hole and the core during hole formation, whereby subsequent removal of the tool from the workpiece is facilitated.

It is yet another object of the invention to provide a blind-tapered hole saw tool which forms a gap of variable width between the opposed surfaces of the hole and the core during hole formation, whereby subsequent removal of the core from either the tool or the workpiece is facilitated.

It is also an object of the invention to provide a blind-tapered hole saw tool with which to form blind-tapered holes in a workpiece featuring ease of use.

Under the invention, a tool for forming a hole in a workpiece comprises an elongate shaft having a first end, a second end, and a longitudinal axis extending between the first end and the second end; a collar, mounted for axial movement on the shaft; and a spring, preferably retained about the shaft, which biases the collar away from the second end of the shaft to a first position on the shaft. The tool further includes a plurality of blade guides mounted on the shaft proximate to the shaft's second end such that the blade guides are rotatable with the shaft about the shaft's longitudinal axis.

A plurality of elongate blades are pivotally attached to the collar at a first nominal radial distance from the longitudinal axis of the shaft. A portion of the length of each blade is fixedly circumferentially- and radially-supported at a second nominal radial distance relative to the shaft and the shaft's longitudinal axis, respectively, by a respective one of the blade guides. The second nominal radial distance is substantially greater than the first nominal radial distance. As a result, the angle formed between each blade and the longitudinal axis of the shaft increases with increasing axial displacement of the collar on the shaft away from the first position, with the angle varying between a first nonzero angle and a second nonzero angle upon such relative axial displacement of the collar on the shaft.

In accordance with another feature of the invention, the tool may preferably include a base plate mounted on the shaft proximate to shaft's second end, with the base plate preferably being rotatable with the shaft. A pilot extension may be conveniently secured to the second end of the shaft coaxial with the shaft's longitudinal axis to facilitate hole formation and tool stability, and to temporarily retain the core on the end of the tool, thereby facilitating the orderly removal of the core from the resulting hole.

While an exemplary tool is illustrated and disclosed, such disclosure should not be construed to limit the claims. It is anticipated that various modifications and alternative designs may be made without departing from the scope of the invention.

BRIEF DESCRIPTION OF DRAWINGS

FIG. 1 is a top end view of an exemplary tool in accordance with the invention, with the tool's cutting blades in a nominally-retracted condition;

FIG. 2 is a side view, partially in cross-section, of the tool taken along line 2—2 of FIG. 1;

FIGS. 3 and 4 are partial cross-sectional views of the tool similar to that illustrated in FIG. 2, showing the tool as its blades increasingly engage a workpiece to thereby form a blind-tapered hole in accordance with the invention; and FIG. 5 is a top view of an alternate base plate and blade guides for use with a tool in accordance with the invention.

BEST MODES FOR CARRYING OUT THE INVENTION

Referring to FIGS. 1 and 2, an exemplary rotary tool 10 with which to form a blind- or "reverse-tapered" through-hole 12 in a workpiece 14 includes an elongate shaft 16, a first end 18 of which terminates in a bit shank of reduced diameter. The second end 20 of the shaft 16 has a generally-flat base plate 22 attached thereto such that the base plate 22 lies in a plane roughly perpendicular to the longitudinal axis 24 of the shaft 16. For reasons to be explained more fully below, in the exemplary tool 10, the base plate 22 is keyed to the shaft 16 so as to ensure rotation of the base plate 22 with the shaft 16.

An elongate, replaceable pilot extension 26 of reduced relative diameter extends through the center of the base plate 22 and is received in a complementary bore 28 concentrically formed in the second end 20 of the shaft 16. While the pilot extension 26 may be temporarily or permanently secured to the tool in any suitable manner, in the first exemplary tool 10 shown in FIGS. 1–4, the pilot extension 26 is conveniently secured in the bore 28 with a set screw 30. Similarly, it will be appreciated that the pilot extension 26 may itself be integrally formed with the shaft 16.

The tool 10 further includes a collar 32 positioned about and rotatable with the shaft 16. Significantly, the collar 32 is manually axially movable on the shaft 16, with the aid of an attached handle 34, from a first position on the shaft 16 adjacent a suitable retainer, such as a E-clip 36, mounted on the shaft 16 near its first end 18, toward the base plate 22. A helical return spring 38 is retained about the shaft 16 between the collar 32 and the base plate 22. The return spring 38 serves to bias the collar 32 away from the base plate 22 and back to the collar's first position on the shaft 16 adjacent the E-clip 36.

A first end 40 of each of three elongate cutting blades 42 is pivotally attached to the collar 32. Each cutting blade 42 is further supported along a portion of its length by a blade guide 44 on the base plate 22. The second end 46 of each cutting blade 42, as well as each cutting blade's leading lateral edge 48, are provided with a cutting edge. The trailing lateral edge 50 of each cutting blade 42 may likewise be provided with a cutting edge, either to permit bidirectional working rotation of the tool or to permit rotation of the cutting blades 42 and, hence, continued tool operation after the leading lateral edges 48 become worn.

While the blade guide 44 may be of any suitable configuration, in the exemplary tool 10 illustrated in FIGS. 1–4, each blade guide 44 conveniently comprises a slot 52 formed in an upturned peripheral portion 54 of the base plate 22. Significantly, the blade guides 44 support the cutting blades 42 both circumferential and radially relative to the shaft 16 while otherwise permitting the relative angle α formed between each cutting blade 42 and the shaft's longitudinal axis 24 to vary between a first nonzero angle and a second nonzero angle.

The blade guides 44 further cooperate with the collar 32 to ensure that the cutting blades 42 rotate with the shaft 16. Thus, in the exemplary tool 10 shown in the drawings, both the collar 32 and the base plate 22 are individually keyed to the shaft 16. However, in accordance with another feature of the invention, and depending upon the physical properties of the material in which blind-tapered holes are to be formed, the blade guides 44 may themselves sufficiently couple the cutting blades 42 to the shaft 16 for rotation therewith, thereby obviating the need to separately key the collar 32 to the shaft 16.

In accordance with another feature of the invention, the leading lateral edge 48 of each blade 42 is maintained by the blade guides 44 so as to be nominally perpendicular to the first surface 56 of the workpiece 14 or, perhaps, with only a slight back angle relative to the first surface 56, to thereby prevent the blade 42 from kicking or otherwise being drawn into the workpiece 14 when the blade 42 engages a nonhomogeneity or other foreign object lodged within the workpiece 14.

FIGS. 3 and 4 show the exemplary tool 10 engaging the first surface 56 of a workpiece 14 made of high-density foam during formation of a blind-tapered hole 12 therein. Specifically, FIG. 3 shows the tool's pilot extension 26 having fully penetrated the first surface 56 of the workpiece 14, with the base plate 22 seated against the first surface 56 of the workpiece 14. FIG. 3 further shows each blade 42 as it begins to penetrate the first surface 56 of the workpiece 14.

Once the pilot extension 26 has completely entered the workpiece 14, and with the base plate 22 of the tool 10 now seated against the first surface 56 of the workpiece 14 as shown in FIG. 3, further application of an axial force to the handle 34 while imparting further rotary motion to the tool 10 will axially displace the handle 34 and the collar 32 toward the base plate 22 and, in turn, extend the cutting blades 42 into the workpiece 14.

As seen in FIGS. 3 and 4, the cutting blades 42 increasingly extend beyond the base plate 22 with increasing relative axial displacement of the handle 34 on the shaft 16 while the relative angle α formed between each cutting blade 42 and the shaft's longitudinal axis 24 increases. In this manner, the rotating cutting blades 42 form a hole 12 with a blind taper, wherein the hole's nominal taper angle increases with increasing penetration of the cutting blades 42 into the workpiece 14.

Once the cutting blades 42 have been advanced to a desired depth in the workpiece 14, the handle 34 is released or otherwise controllably withdrawn, whereupon the spring 38 returns the collar 32 to its first position on the shaft 16, thereby withdrawing each cutting blade 42 from the workpiece 14. And, as best seen in FIG. 4, the changing blade angle α generates a gap 58 of variable width between the opposed frustoconical surfaces of the core 60 and the hole 12 which, in turn, facilitates withdrawal of the cutting blades 42 from the workpiece 14, particularly when no further rotation is imparted to the tool 10 during such withdrawal.

Indeed, in accordance with another feature of the invention, given the ease with which the cutting blades 42 may be withdrawn from the workpiece 14, without any significant disruption or shock to the workpiece 14, it may be particularly desirable to advance the cutting blades 42 short of the nominal thickness of the workpiece 14, whereupon any debris not otherwise discharged from the gap 58 may be blown clear by any suitable manner prior to "knocking out" the core 60 from the hole 12. And, as to the latter operation, the invention contemplates knocking out the core 60 by shifting the tool axially while the pilot extension 26 still penetrates the first surface 56 of the workpiece 14. The separated core 60 may then conveniently be removed from the tool's pilot extension 26.

FIG. 5 shows an alternate base plate 62 with attached blade guides 64 for use with the exemplary tool 10 shown in FIGS. 1–4. Specifically, each blade guide 64 is removably secured to the alternate base plate 62 at one of a plurality of operator-selected radial positions thereon as with suitable fasteners 66 and corresponding detents or locating holes 68. The alternate base plate 62 and, hence, the blade guides 64 secured thereto are themselves rotatable with the tool's elongate shaft.

While an exemplary embodiment of the invention has been illustrated and described, it is not intended that this embodiment illustrate and describe all possible forms of the invention. Rather, it is intended that the following claims cover all modifications and alternative designs, and all equivalents, that fall within the spirit and scope of this invention.

For example, while the blade guides 44, 64 of the exemplary tool 10 are integral to or otherwise rotatable with the base plate 22, 62, the invention contemplates the use of one or more separate blade guides (not shown) which are themselves nonrotatably secured to the shaft 16 proximate to its second end 20. In accordance with another feature of the invention, when such separate blade guides are used, the base plate may preferably freely rotate on the second end 20 of the shaft 16 to otherwise advantageously reduce the relative sliding of the base plate on the first surface 56 of the workpiece 14 during hole forming. A thin bushing (not shown) on the underside of the base plate may alternatively be used to reduce any deleterious frictional engagement between the base plate and the workpiece 14.

Similarly, while the handle 34 and, hence, the collar 32 and cutting blades 42 of the exemplary tool 10 are manually displaced on the shaft 16, the invention contemplates the use of any suitable mechanism by which to impart controlled axial movement to the collar. By way of example only, the invention contemplates use of a worm-type drive arrangement with which to selectively advance the cutting blades 42 into the workpiece 14. In this manner, for example, the relative speed at which the cutting blades 42 are advanced into the workpiece 14 may be precisely controlled.

What is claimed is:

1. A rotary tool for forming a hole in a workpiece comprises:
   an elongate shaft having a first end, a second end and a longitudinal axis extending between the first end and the second end;
   a collar, mounted for axial movement on the shaft;
   a spring biasing the collar away from the second end of the shaft to a first position on the shaft;
   a plurality of blade guides mounted on the shaft proximate to the second end thereof such that the blade guides are rotatable with the shaft about the longitudinal axis thereof; and
   a plurality of elongate blades pivotally attached to the collar, wherein a portion of the length of each one of the blades is fixedly circumferentially and radially supported relative to the shaft by a respective one of the blade guides, and wherein the angle formed between each blade and the longitudinal axis of the shaft increases with increasing axial displacement of the collar on the shaft away from the first position.

2. The rotary tool of claim 1, wherein the collar rotates with the shaft.

3. The rotary tool of claim 1, further including a base plate mounted on the shaft proximate to the second end thereof.

4. The rotary tool of claim 3, wherein the base plate rotates with the shaft.

5. The rotary tool of claim 4, wherein the spring is positioned between the base plate and the collar.

6. The tool of claim 1, wherein the angle varies between a first nonzero angle and a second nonzero angle upon relative axial displacement of the collar on the shaft.

7. The tool of claim 1, including a pilot extension removably secured to the second end of the shaft.

8. A tool for forming a hole in a workpiece comprises:
   an elongate shaft having a first end, a second end and a longitudinal axis extending between the first end and the second end;
   a collar, mounted for axial movement on the shaft;
   a plurality of blade guides mounted on the shaft proximate to the second end thereof such that the blade guides are rotatable with the shaft about the longitudinal axis thereof; and
   a plurality of elongate blades pivotally attached to the collar at a first nominal radial distance from the longitudinal axis of the shaft, each of the blades being circumferentially and radially supported at a second nominal radial distance relative to the shaft and the longitudinal axis of the shaft, respectively by a respective one of the blade guides, the first nominal radial distance being substantially less than the second nominal radial distance, whereby the angle formed between a blade and the longitudinal axis of the shaft varies upon relative axial displacement of the collar on the shaft.

9. The rotary tool of claim 8, further including a spring biasing the collar to a first position on the shaft remote from the second end of the shaft.

10. The rotary tool of claim 9, wherein the spring is positioned between the base plate and the collar.

11. The rotary tool of claim 8, wherein the collar rotates with the shaft.

12. The rotary tool of claim 8, further including a base plate mounted on the shaft proximate to the second end thereof.

13. The rotary tool of claim 12, wherein the base plate rotates with the shaft.

14. The tool of claim 8, wherein the angle varies between a first nonzero angle and a second nonzero angle upon relative axial displacement of the collar on the shaft.

* * * * *